(12) United States Patent
Corghi

(10) Patent No.: US 6,684,517 B2
(45) Date of Patent: Feb. 3, 2004

(54) DEVICE FOR DETERMINING GEOMETRICAL DEFECTS IN A VEHICLE WHEEL

(75) Inventor: Remo Corghi, Correggio (IT)

(73) Assignee: Corghi S.p.A., Reggio Emilia (IT)

( * ) Notice: Subject to any disclaimer, the term of this patent is extended or adjusted under 35 U.S.C. 154(b) by 0 days.

(21) Appl. No.: 09/858,893

(22) Filed: May 17, 2001

(65) Prior Publication Data

US 2002/0056204 A1 May 16, 2002

(30) Foreign Application Priority Data

Nov. 16, 2000 (IT) .................................... RE2000A0116

(51) Int. Cl.$^7$ ................................................ G01B 5/28
(52) U.S. Cl. .................. 33/550; 33/203.12; 33/203.18; 33/555
(58) Field of Search .............................. 33/203, 203.12, 33/203.18, 520, 549, 550, 551, 553, 554, 555

(56) References Cited

U.S. PATENT DOCUMENTS

| | | | | |
|---|---|---|---|---|
| 2,266,224 A | * | 12/1941 | MacMillan | 33/203.12 |
| 3,633,279 A | * | 1/1972 | Frazier et al. | 33/203.12 |
| 3,906,639 A | * | 9/1975 | Wilamowski | 33/520 |
| 4,290,205 A | * | 9/1981 | Holm | 33/203 |
| 4,631,832 A | * | 12/1986 | Schrammen et al. | 33/203.12 |
| 4,837,980 A | * | 6/1989 | Rogers, Jr. | 451/26 |
| 4,936,138 A | * | 6/1990 | Cushman et al. | 73/146 |
| 4,962,664 A | * | 10/1990 | Hirano et al. | 33/203.13 |
| 5,033,003 A | * | 7/1991 | Lees, Sr. | 33/203.18 |
| 5,313,710 A | * | 5/1994 | Wakamori et al. | 33/203.12 |
| 5,485,406 A | * | 1/1996 | Wada et al. | 33/551 |
| 5,678,963 A | * | 10/1997 | Heimann | 33/555 |
| 5,781,286 A | * | 7/1998 | Knestel | 33/203.18 |
| 5,987,761 A | * | 11/1999 | Ohnesorge | 33/203.18 |
| 6,018,878 A | * | 2/2000 | Fukuda et al. | 33/203.12 |
| 6,089,083 A | * | 7/2000 | Curtis | 73/146 |
| 6,293,022 B1 | * | 9/2001 | Chino et al. | 33/203.18 |
| 6,457,249 B1 | * | 10/2002 | Corghi | 33/554 |

FOREIGN PATENT DOCUMENTS

| | | |
|---|---|---|
| DE | 39 08 866 A1 | 3/1990 |
| EP | 1 054 247 A2 | 11/2000 |

\* cited by examiner

*Primary Examiner*—Diego Gutierrez
*Assistant Examiner*—Madeline Gonzalez
(74) *Attorney, Agent, or Firm*—Browdy and Neimark

(57) ABSTRACT

A device for determining geometrical defects in a vehicle wheel comprises, for measuring the eccentricity of the wheel rim (5) and of the wheel (4), means (7) to be positioned in contact alternately with the tyre (6) and with the wheel rim (5) of the wheel of which the eccentricity is to be measured, a sensor (8) for measuring the angular position assumed by said means (7) about a fixed reference point (9), and means for associating and processing the data measured by said means (7) and by said sensor (8) to determine the angle through which the tyre (6) must be rotated on the wheel rim (5) to compensate their errors of shape. Said angular sensor (8) comprises a fixed part (80) carried by a shaft (23) associated with self-centering support means (21, 19, 200, 203) arranged to position it exactly coaxial with said wheel rim, and a movable part (81) rotatably mounted on said shaft (23).

13 Claims, 5 Drawing Sheets

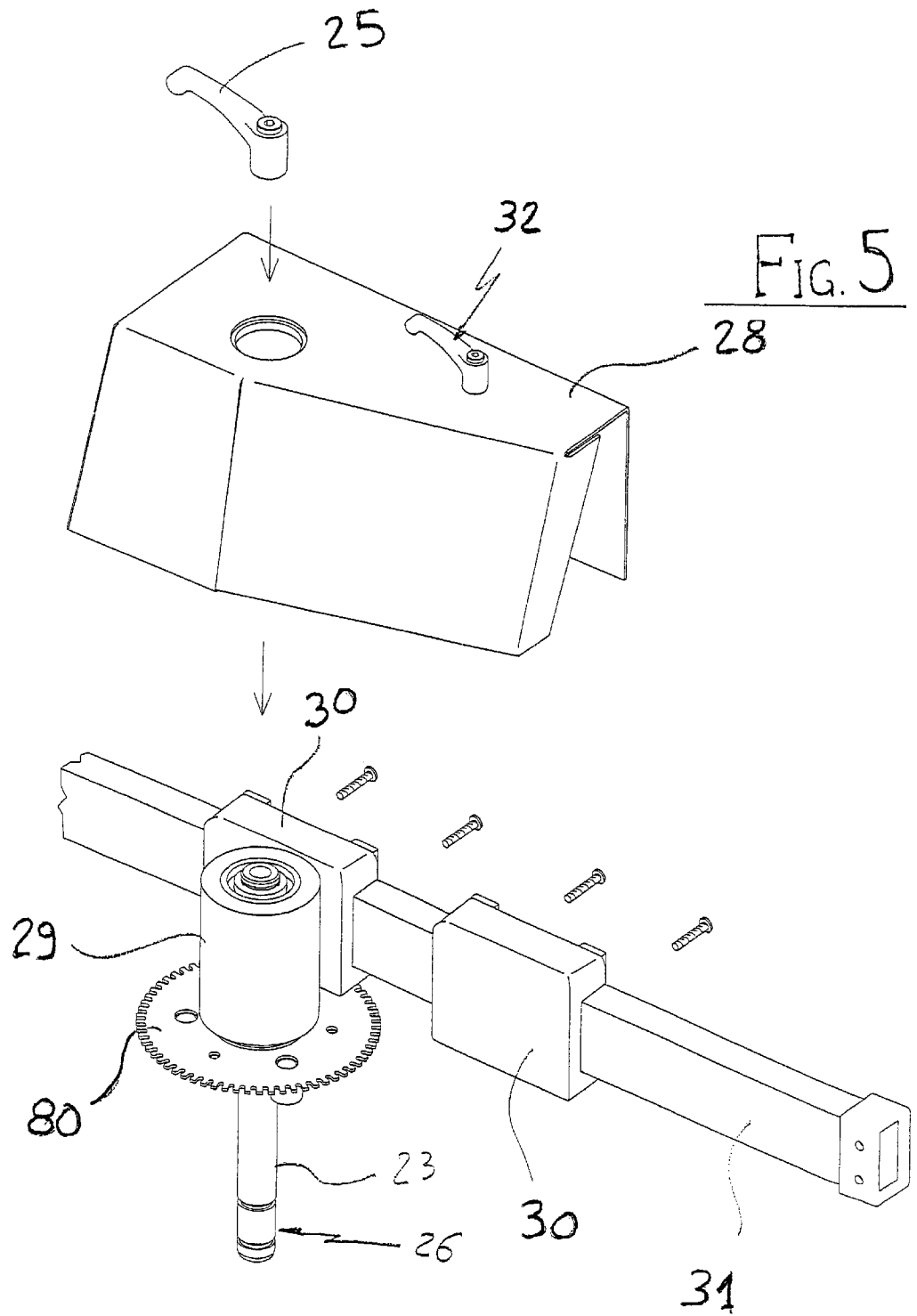

DEVICE FOR DETERMINING GEOMETRICAL DEFECTS IN A VEHICLE WHEEL

This invention relates to a device for determining geometrical defects in a vehicle wheel.

A vehicle wheel, i.e. the combined tyre plus wheel rim, can present shape imperfections or defects which reduce the running comfort of the vehicle, these being due partly to defects in the tyre construction and partly to defects in the wheel rim construction.

The said shape defects can be largely compensated on mounting the tyre on the wheel rim by suitably positioning the tyre relative thereto.

The same applicant has invented an apparatus able to determine geometrical defects of the wheel when this is locked on the self-centering unit of a tyre removal machine.

This apparatus forms the subject of the European Patent Application published under No. 1,054,247, to which reference should be made for a more detailed description.

Although said apparatus performs the functions for which it is proposed, it has proved inaccurate in determining imperfections.

A first inaccuracy is due to the fact that the centre of the wheel rim, or of the wheel, is calculated mathematically by interpolation, involving an inevitable measurement error which is then reflected in the determination of the results.

In addition, the eccentricity defects of the wheel rim are measured at the inner edge of the wheel rim and not, as would be correct, at the channel which receives the tyre bead. This introduces into the measurement an approximation which is often unacceptable.

The object of the present invention is to overcome the drawbacks of the said apparatus within the framework of a rational and reliable solution.

The invention attains said object by providing, for determining the geometrical defects of a vehicle wheel rim or wheel, a device provided with means for mechanically determining the centre of the wheel rim and/or wheel. This advantageously results in complete elimination of the error in determining the wheel rim centre which arises in the known apparatus.

The device of the invention comprises, for measuring the eccentricity of the wheel rim and of the wheel, a device to be positioned in contact alternately with the edge of the wheel and with the edge of the wheel rim of which the eccentricity is to be measured, an angular sensor for measuring the angular position of said measurement unit about a fixed point, and means for associating and processing the data measured by said unit and by said angular sensor to determine the angle through which the tyre must be rotated on the wheel rim to compensate their errors of shape.

In particular, according to the invention, said angular sensor comprises a movable part associated with said eccentricity measurement unit, and a fixed part rigid with a shaft provided with self-centering support means which enable it to be positioned exactly coaxial with the axis of said wheel rim.

Finally, it should be noted that the invention can be advantageously associated with the self-centering plate with which tyre removal machines of known type are provided.

Further characteristics of the invention are defined in the claims.

The constructional characteristics and merits of the invention will be apparent from the ensuing detailed description given with reference to the figures of the accompanying drawings, which show two particular preferred embodiments thereof by way of non-limiting example.

FIG. 5 is an exploded perspective view of the sensor with which the invention is provided.

Figure 1:
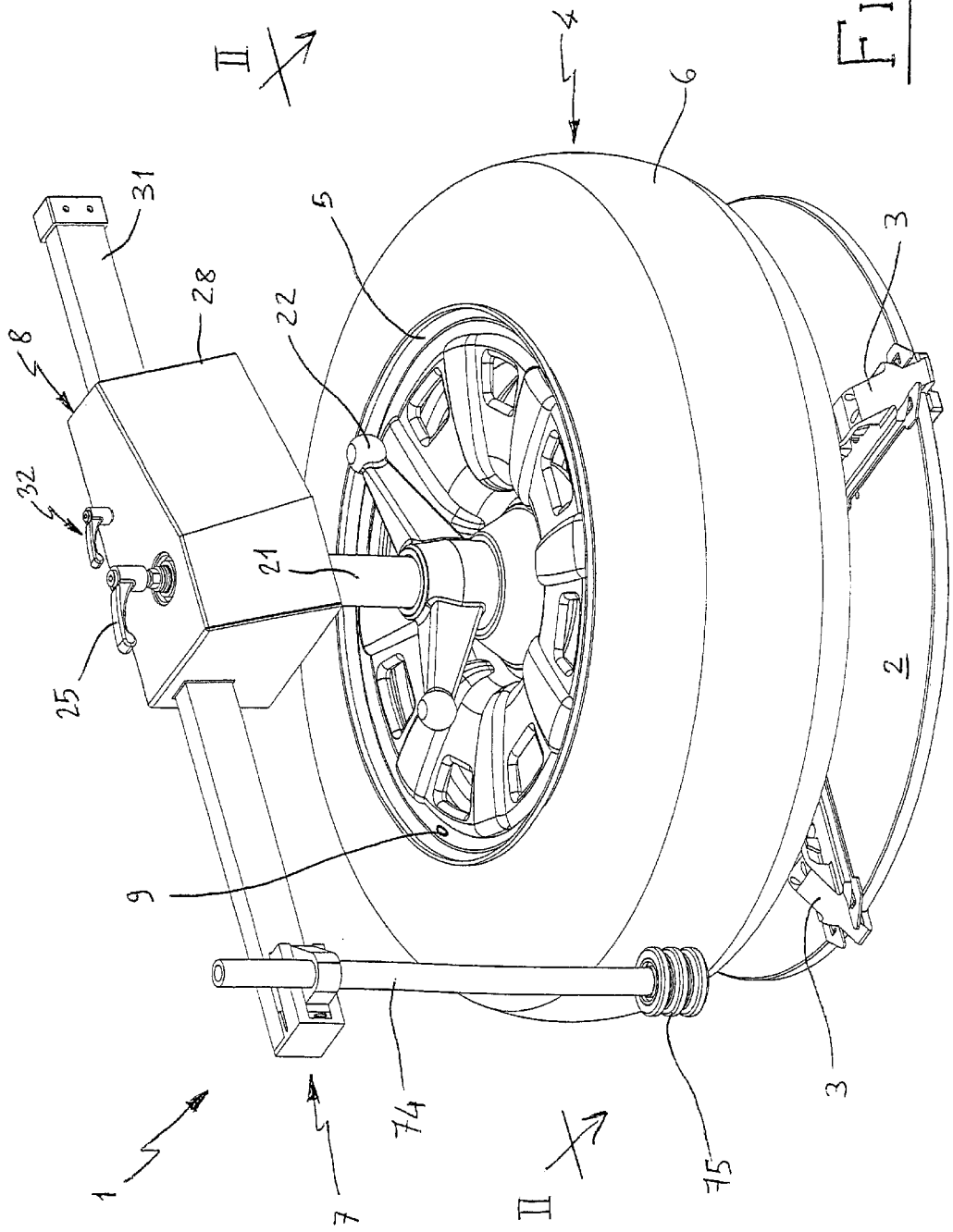
FIG. 1 is a perspective view of the device of the invention.

Said FIGS. 1, 2, 4 and 5 show the device of the invention, associated with a self-centering plate 2 of a tyre removal machine, not shown because of known type. The self-centering plate 2 is provided with clamps 3 for locking a wheel, comprising the wheel rim 5 and tyre 6.

The device 1 comprises a unit 7 for measuring the eccentricity of the wheel 4, which is associated with a sensor 8 for measuring the angular position occupied by said unit 7 about a fixed point. In particular, the fixed point can be a point rigid with the wheel rim 5, for example it can advantageously be the hole 9, shown in FIG. 4, through which the tyre inflation valve passes, or the actual inflation valve itself, not shown. Unit 7 and sensor 8 are both connected to an associating and data processing means 33 that processes data from unit 7 and sensor 8 to determine the angle through which the tyre 6 must be rotated on the wheel rim 5 to compensate their errors of shape.

The sensor 8 is supported by the self-centering support means 10, described hereinafter, above the wheel rim 5, exactly coaxial with the axis of the wheel rim 5.

Figure 2:
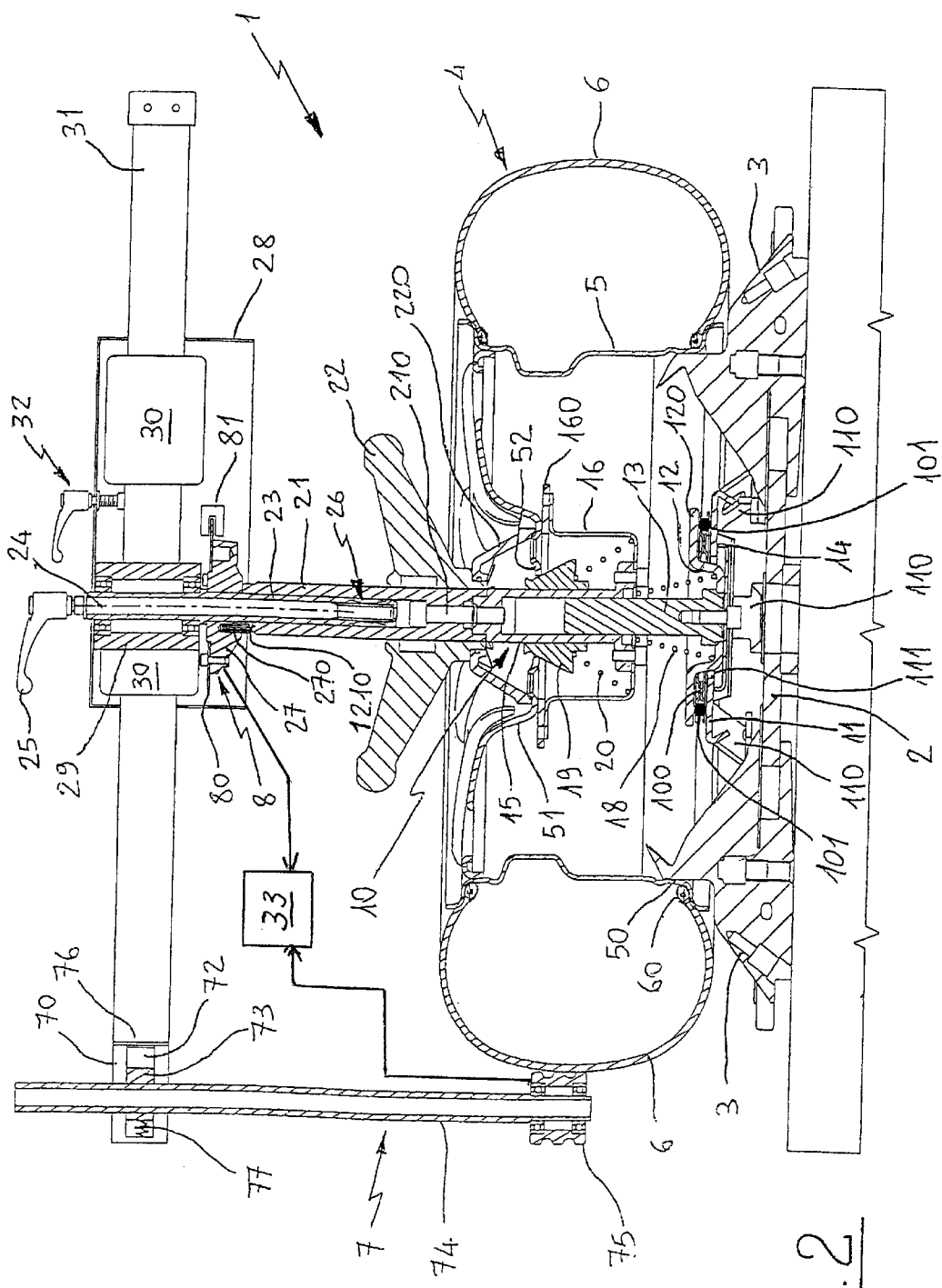
FIG. 2 is an axial section through a first embodiment of the device of the invention.

With particular reference to FIG. 2, said self-centering support means 10 comprise a circular lower base 11 provided with four support feet 110, two of which are provided with magnets. The base 11 presents a central hole 111 containing the lower portion of a dish 12 provided with a wide flat upper edge 120. The dish 12 carries a central shaft 13, to the lower end of which there is fixed a shaped washer 14, the outer diameter of which is greater than the diameter of the central hole of the base 11, and is positioned below the base 11. Between the upper surface of the base 11 and the lower surface of the edge 120 of the dish 12 there is positioned a thrust bearing provided with a plurality of balls 101, which enable the dish 12 and the shaft 13 to move relative to the base 11.

On the shaft 13 there is mounted a hollow pin 15, which passes through the hole 52 in the hub 51 of the wheel rim 5, and lowerly carries a cup member 16, on the upper edge of which there is fixed a ring 160.

The ring 160 is maintained in contact with the lower edge of the hub 51 by a spring 18, one end of which rests on the base of the dish 12, and the other end rests against the lower surface of said pin 15.

There is also mounted on the pin 15 a centering cone 19 which can slide on said pin while being supported by a spring 20, one end of which rests on the base of said cup member 16 and the opposite end rests against the lower surface of the cone. In detail, said spring maintains the self-centering cone inserted into the hole 52 in the hub 51 of the wheel rim 5.

To the upper end of said pin 15 there is fixed by the screw 210 an externally threaded hollow shank 21 on which there is screwed a handwheel 22 provided lowerly with a hollow conical member 220 which rests against the upper surface of the hub 51. By screwing down the handwheel 22, the shank 21, the pin 15 and the shaft are positioned and locked in position exactly coaxial with the axis of the wheel rim 5. In this respect, screwing down the handwheel 22 causes the shank 21 and pin 15 to move upwards on the shaft 13, while the action of the spring 18 maintains the ring 160 against the lower surface of the hub 51, the centering cone 19 being at the same time maintained in the hole 52 of the hub by the spring 20. Any errors in the positioning of the shaft 13 are corrected by the movement which the dish 12 on which the shaft 13 is fixed can undergo relative to the base 11.

In the shank 21 there is inserted a second centrally hollow shaft 23 receiving a pin 24 the upper end of which is connected to an operating lever 25 of a usual expansion device 26 fixed to the lower end of said pin 24. Rotating the lever 25 locks the shaft 23 relative to the shank 21 by the action of said expansion device 26.

The sensor 8 for measuring the angular position which said unit 7 assumes about a fixed point is associated with the shaft 23.

Said sensor 8, which in the illustrated example is an encoder, comprises a disc 80 and a usual measuring element 81 visible in FIG. 2. The fixed disc 80 is locked on the top of a plate 27 fixed on the outside of the shaft 23, whereas the movable measuring element 81 is fixed to a protection cover 28.

The plate 27 presents a lower pin 270 to be inserted into a corresponding groove 1210 present in the upper edge of the shank 21.

On the shaft 23 there is also idly mounted a cylindrical bush 29 rigid with one of the two guides 30 in which there slides a horizontal rod 31, one end of which supports the eccentricity measurement unit 7.

With reference to FIG. 5, said guides 30 are fixed to the protection cover 28, said rod 31 being lockable relative to the guides 30 by a usual locking device 32, rigid with the cover 28.

With reference to FIG. 2, the unit 7 comprises a block 70 provided with a usual channel 72 for receiving the end of a slide 73 carrying a height-positionable vertical rod 74, to the lower end of which a roller 75 is idly secured. The roller 75 is intended to be brought into contact with the tread of the tyre 6 during the eccentricity measurement of the wheel 4, and into contact with that channel 50 of the wheel rim 5 receiving the bead 60 of the tyre 4 during the eccentricity measurement of the wheel rim 5.

In detail, between the rear end of said channel 72 and the front wall of the slide 73 there is interposed a compression spring 77 the purpose of which is to maintain the roller 75 resting against the side of the tyre 4. Said slide 73 is prevented from escaping from the channel by a plate 76 fixed to the rear end of said channel 72. Associated with the slide 73 there is the movable measuring element 780 (FIG. 4) of a linear sensor 78, the fixed element 781 of which is rigid with the block 70, this sensor measuring the imperfections of the wheel and wheel rim.

Finally, it should be noted that the device 1 has been illustrated only in the configuration in which only imperfections of the wheel 4 are determined, but it is also used to determine imperfections in the wheel rim alone, as explained in the description of operation of the invention.

The measured eccentricity data of the wheel 4 and wheel rim 5 are fed to a processor, not shown, which processes them to calculate the angle through which the tyre must be rotated about the wheel rim to compensate the measured imperfections.

Figure 3:
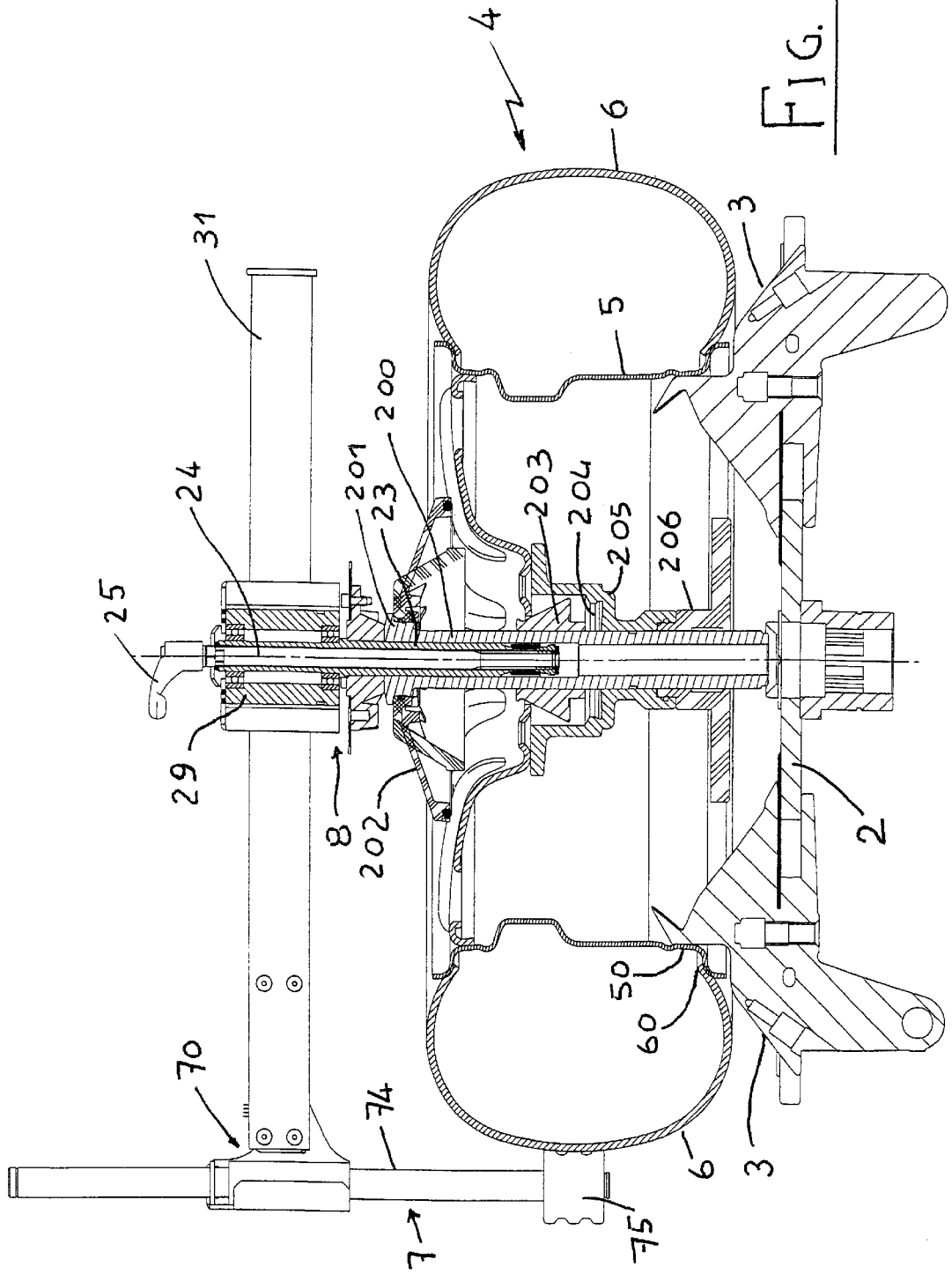
FIG. 3 is an axial section through a second embodiment of the device of the invention.
Figure 4:
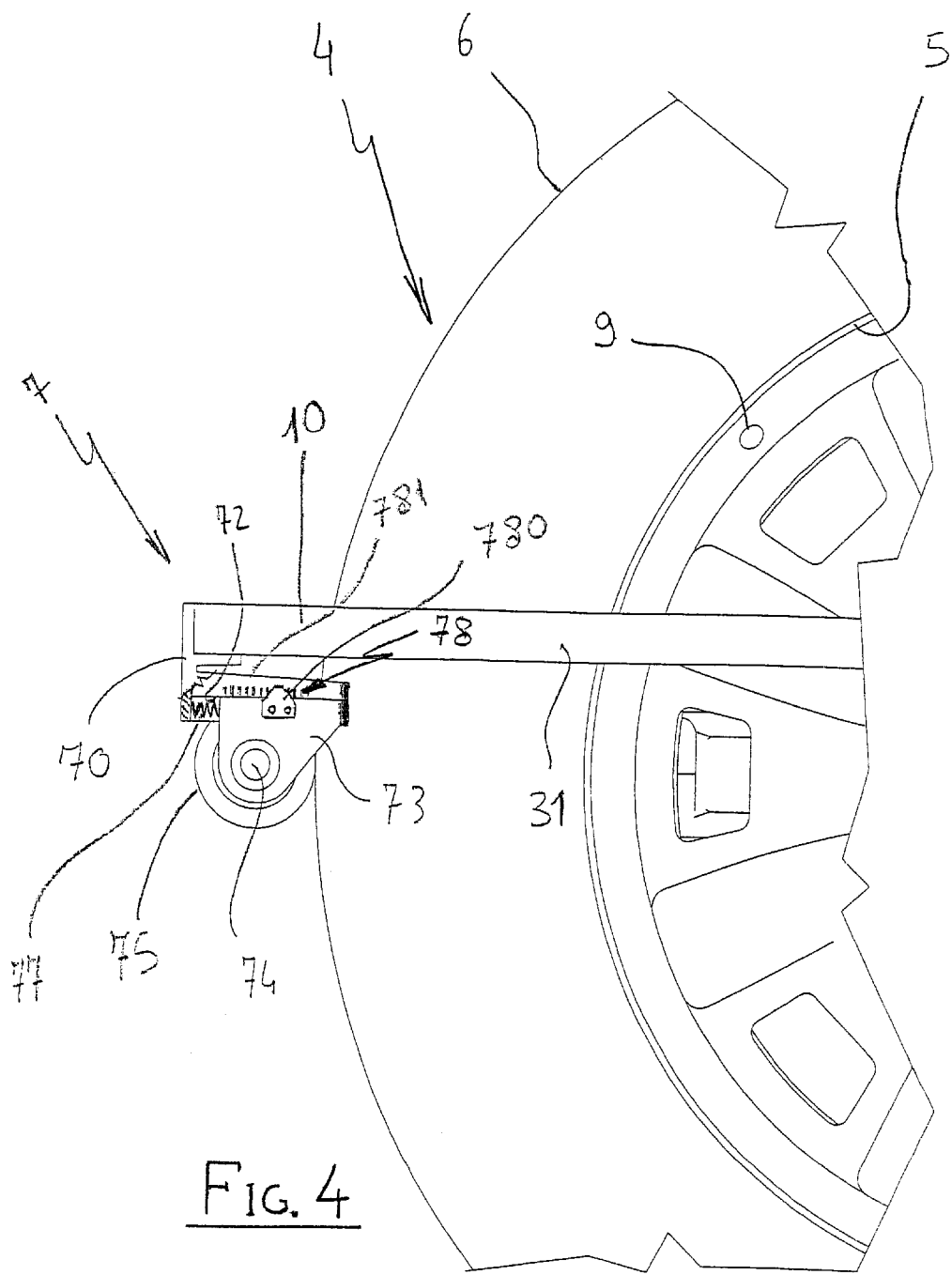
FIG. 4 is an enlarged view from above of a portion of FIG. 1 showing the eccentricity measurement unit.

The second embodiment is shown in FIG. 3, in which those components which also appear in FIGS. 1, 2, 4 and 5 are indicated by the same reference numerals.

In this embodiment the invention comprises a hollow shaft 200 having a wide head 201 against which a cap 202 rests.

With reference to the orientation of FIG. 3, the shaft 200 extends downwards to receive, in the stated order, a centering cone 203, an underlying spring washer 204 and an inverted cup member 205, all said means being freely slidable on the shaft.

The member 205 is lowerly associated, with axial constraint, with an underlying handwheel 206 screwed onto the threaded lower end of the shaft 200.

The hollow shaft 23, the characteristics of which are those already described in the first embodiment, is inserted from above into the axial cavity of the shaft 200.

The hollow shaft 23 carries the eccentricity measurement means 7 in a manner identical to that described in the first embodiment.

The operation of the invention will now be described with the aid of the accompanying drawings.

With reference to FIG. 1, the operator firstly places on the self-centering plate 2 the base 11 on which the pin 15 with the relative centering cone 19 is mounted, then rests the wheel rim 5 on said plate 2 and locks it in position by the clamps 3.

The operator then fixes the shank 21 onto the pin 15 and screws down the handwheel 22 to exactly align the shank 21, the pin 15 and the shaft 13 with the axis of the wheel rim 5 of the wheel 4.

In the case of the embodiment of FIG. 3, the operator instead inserts the shaft 200 into the wheel from above, until the cap 202 rests on the wheel rim.

Having done this, he mounts on the shaft 200, from below in the stated order, the centering cone 203, the spring washer 204 and the member 205 already associated with the handwheel 206.

By screwing down the handwheel 206 the member 205 is rested against the hub of the wheel rim and the centering cone clamps into the central hole of the wheel rim by the action of the spring 204, the shaft 200 hence being positioned rigorously coaxial with the wheel rim axis.

To facilitate the subsequent operations the wheel rim is then fixed onto the self-centering plate of the tyre removal machine.

After arranging the shank 21 (first embodiment) or the shaft 200 (second embodiment), the operator proceeds as follows.

He firstly inserts the shaft 23 into the shank 21 or into the shaft 200 and locks it in position by means of the expansion device 26 by operating the lever 25.

The operator then rotates the rod 31 into a position corresponding with a preselected fixed point rigid with the wheel rim, for example the hole 9.

At this point he rests the roller 75 against the surface of the wheel rim channel 50 by preloading the spring 77 (not visible in FIG. 3) until the processor indicates, by a sound and/or light signal, that the sensor 78 (not visible in FIG. 3) rigid with the member 73 is in the correct position. The operator then locks the rod 31 in position by the locking device 32 (not visible in FIG. 3), and manually rotates the unit 7 through 360° about the wheel rim 5. The measured data are memorized by the processor.

The operator then mounts the tyre 6 on the wheel rim and inflates it, after which he brings the roller 75 into contact with the side of the tyre 6, and measures the wheel imperfections by repeating the operations described in determining the imperfections of the wheel rim 5.

Once the wheel imperfections have also been determined, the processor processes both the data relative to these imperfections and the previously memorized data relative to the imperfections of the wheel rim alone, in order to calculate the angle through which the tyre has to be rotated about the wheel rim to compensate the imperfections measured.

The operator then rotates the rod 31 until a sound and/or light signal informs him that the angle through which the tyre has to be rotated about the wheel rim 5 has been identified. Using a pen or a piece of adhesive tape, he applies a reference mark to the tyre at the angular position of the rod 31. He then deflates the tyre and rotates it until the reference mark on the tyre coincides with the fixed point rigid with the wheel rim, i.e. with the hole 9.

The measurement could also be firstly effected on the wheel and then on the wheel rim by locating the zero point on the tyre by applying a reference mark.

Finally it should be noted that, in a simplified embodiment, the invention could be intended only for determining imperfections of the wheel rim and wheel to evaluate whether these fall within the range scheduled by the manufacturer.

What is claimed is:

1. A device for determining geometrical eccentricity defects in a vehicle wheel composed of a wheel rim and a tire mounted on the wheel rim, comprising eccentricity measuring means (7) positionable in contact alternately with the tire (6) and with the wheel rim (5) of the wheel of which the eccentricity is to be measured, a sensor (8) for measuring the angular position assumed by said means (7) about a fixed reference point (9), and means for associating and processing the data measured by said means (7) and by said sensor (8) to determine the angle through which the tire (6) must be rotated on the wheel rim (5) to compensate their errors of shape, wherein said sensor (8) comprises a fixed part (80) carried by a first shaft (23) disposed to be locked to the wheel rim and coaxial therewith, and a movable part (81) rotatably mounted on said first shaft (23).

2. A device as claimed in claim 1, further comprising self-centering support means for positioning said first shaft (23) coaxially with the wheel rim, wherein said self-centering support means comprise a pair of cup members (16, 220, 202, 205) disposed to clamp the hub of the wheel rim between them and between which there is a centering cone (19, 203) disposed to be maintained elastically urged into the central hole of said hub.

3. A device as claimed in claim 2, wherein said self-centering support means for said shaft (23) further comprise a base (11) from which there upwardly projects a second shaft (13), positionable relative to said base (11), and on which there is mounted a pin (15) carrying said centering cone (19) sliding axially on said pin (15) and disposed to be maintained in the hole of the wheel rim hub by elastic means, and said self-centering support means for said shaft (23) further comprise a shank (21) which receives said shaft (23) and which is fixed to said pin.

4. A device as claimed in claim 3, wherein said second shaft (13) is supported on said base by a thrust bearing (100) provided with balls (101).

5. A device as claimed in claim 3, wherein said elastic means provided to maintain the centering cone (19) in the interior of the hole (52) in the hub (51) comprises a spring (20).

6. A device as claimed in claim 3, wherein said pin (15) is mounted on said second shaft (13) by way of second elastic means.

7. A device as claimed in claim 6, wherein said second elastic means is a spring (18).

8. A device as claimed in claim 1, further comprising self-centering support means for positioning said first shaft (23) relative to said wheel rim, wherein said self-centering support means comprise a hollow third shaft (200) which receives, in the stated order, a cap (202), the hub of the wheel rim, a centering cone (203), an underlying spring washer (204) and an inverted cup member (205), all said means being freely slidable on said hollow third shaft, the member (205) being lowerly locked axially, but free to rotate, on an underlying handwheel (206) which is screwed onto the lower end of said hollow third shaft (200).

9. A device as claimed in claim 8, wherein said first shaft (23) which carries the eccentricity measurement means (7) is inserted into an axial cavity enclosed by said hollow third shaft (200) from above.

10. A device as claimed in claim 1, wherein said eccentricity measurement means (7) comprise a horizontal rod (31) rotatable about said first shaft (23), a slide associated with position sensors which is slidable along said rod and is maintained towards the center of the wheel by elastic means, a vertical rod (74) slidable vertically within a seat of said slide, and an idle roller (75) positioned at the base of said second rod to make contact with the wheel rim edge or with the tire tread of the wheel.

11. A device as claimed in claim 1, wherein said angular sensor (80, 81) is an encoder.

12. A device as claimed in claim 1, wherein said fixed reference point (9) rigid with the wheel rim is a tire inflation valve.

13. A device as claimed in claim 1, wherein said fixed reference point (9) rigid with the wheel rim is a hole from which a tire inflation valve emerges.

* * * * *